(12) United States Patent
Ward

(10) Patent No.: US 8,069,731 B2
(45) Date of Patent: Dec. 6, 2011

(54) HEATING AND AIR CONDITIONING SERVICE GAUGE

(75) Inventor: Charles Barry Ward, Alpharetta, GA (US)

(73) Assignee: Diversitech Corporation, Duluth, GA (US)

( * ) Notice: Subject to any disclaimer, the term of this patent is extended or adjusted under 35 U.S.C. 154(b) by 143 days.

(21) Appl. No.: 12/713,337

(22) Filed: Feb. 26, 2010

(65) Prior Publication Data

US 2010/0162822 A1 Jul. 1, 2010

Related U.S. Application Data

(63) Continuation-in-part of application No. 12/206,958, filed on Sep. 9, 2008, now Pat. No. 7,685,882, which is a continuation-in-part of application No. 11/743,374, filed on May 2, 2007, now Pat. No. 7,437,941.

(60) Provisional application No. 60/746,720, filed on May 8, 2006, provisional application No. 61/026,812, filed on Feb. 7, 2008.

(51) Int. Cl.
*G01L 9/00* (2006.01)

(52) U.S. Cl. .......................... 73/732; 73/733

(58) Field of Classification Search .................. None
See application file for complete search history.

(56) References Cited

U.S. PATENT DOCUMENTS

| | | | |
|---|---|---|---|
| 2,470,714 A | 5/1949 | Nevius | |
| 4,455,874 A | 6/1984 | Paros | |
| 4,718,279 A | 1/1988 | Hestich | |
| 4,770,044 A * | 9/1988 | Ferris | 73/744 |
| 4,891,987 A | 1/1990 | Stockton et al. | |
| 5,022,269 A * | 6/1991 | Lew | 73/702 |
| 5,070,736 A * | 12/1991 | Lew | 73/736 |
| 6,553,777 B2 | 4/2003 | Dillenback | |
| 6,983,889 B2 | 1/2006 | Alles | |
| 7,012,223 B2 | 3/2006 | Kopel | |
| 7,119,308 B2 | 10/2006 | Kopel | |
| 7,194,910 B2 | 3/2007 | Gatesman | |
| 7,219,506 B2 | 5/2007 | Kang et al. | |
| 7,437,941 B1 * | 10/2008 | Ward | 73/753 |
| 7,603,889 B2 | 10/2009 | Cypes et al. | |
| 7,685,882 B1 * | 3/2010 | Ward | 73/753 |
| 2009/0183574 A1 * | 7/2009 | Lee | 73/741 |

OTHER PUBLICATIONS

DRSA-1100 User Manual, Digi-Cool Industries Ltd., Digital Refrigeration System Analyzer, Copyright 2004, Digi-Cool Industries Ltd.
Web pages from www.digi-cool.com showing various types of refrigeration products dated Jul. 18, 2007. Datasheet regarding the DRSA-1200 Digital Refrigeration System Analyzer, Digi-Cool Industries Ltd.
DRSA-1200 User Manual, Digi-Cool Industries Ltd., Digital Refrigeration System Analyzer, Copyright 2007, Digi-Cool Industries Ltd.
Datasheet regarding the DRSA-1100 Digital Refrigeration System Analyzer, Digi-Cool Industries Ltd.

* cited by examiner

*Primary Examiner* — Andre Allen
(74) *Attorney, Agent, or Firm* — Smith Gambrell & Russell LLP

(57) ABSTRACT

A service gauge for determining refrigerant pressure and the saturated vapor equivalent temperature, or other parameters, for a refrigerant in an HVAC system. In one embodiment, the service gauge employs a bourdon tube with at least one attached strain gauge to sense the refrigerant pressure and produce an electronic pressure signal. In another embodiment, a magnet and rotary position sensor produces an electronic signal proportional to the refrigerant pressure. The electronic pressure signal from the output of the strain gauge or the rotary position sensor is connected to a microprocessor, which calculates and displays the refrigerant pressure, the saturated vapor equivalent temperature for a variety of refrigerants, produces instantaneous and time lapsed representations of those parameters, and other parameters of the refrigerant.

6 Claims, 12 Drawing Sheets

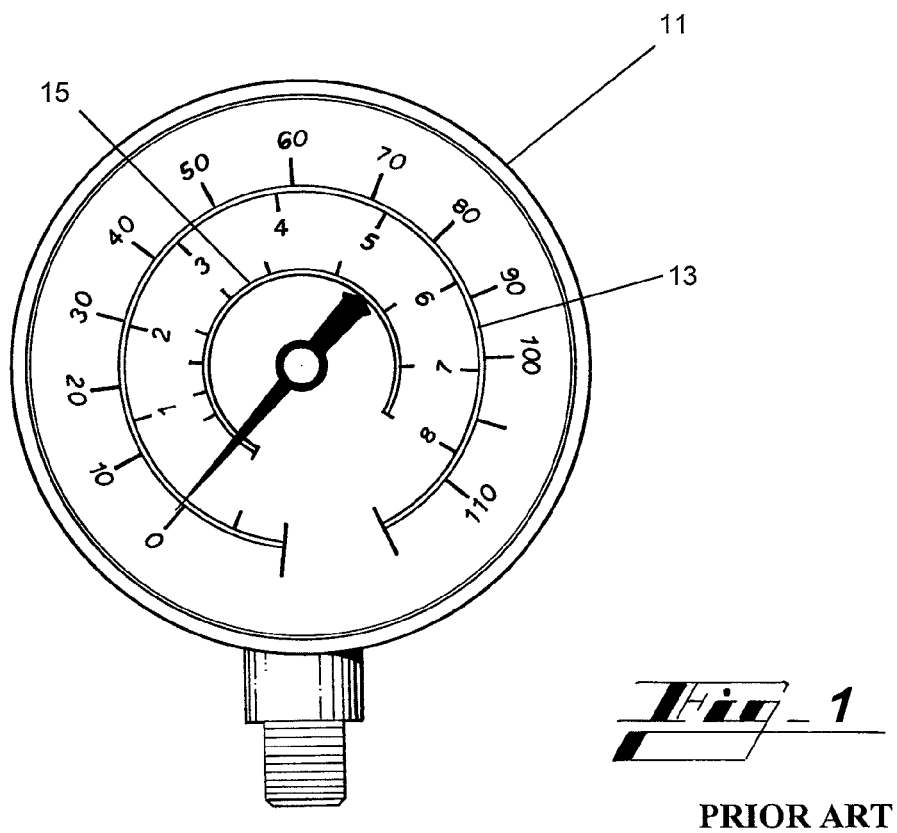
Fig_1
PRIOR ART
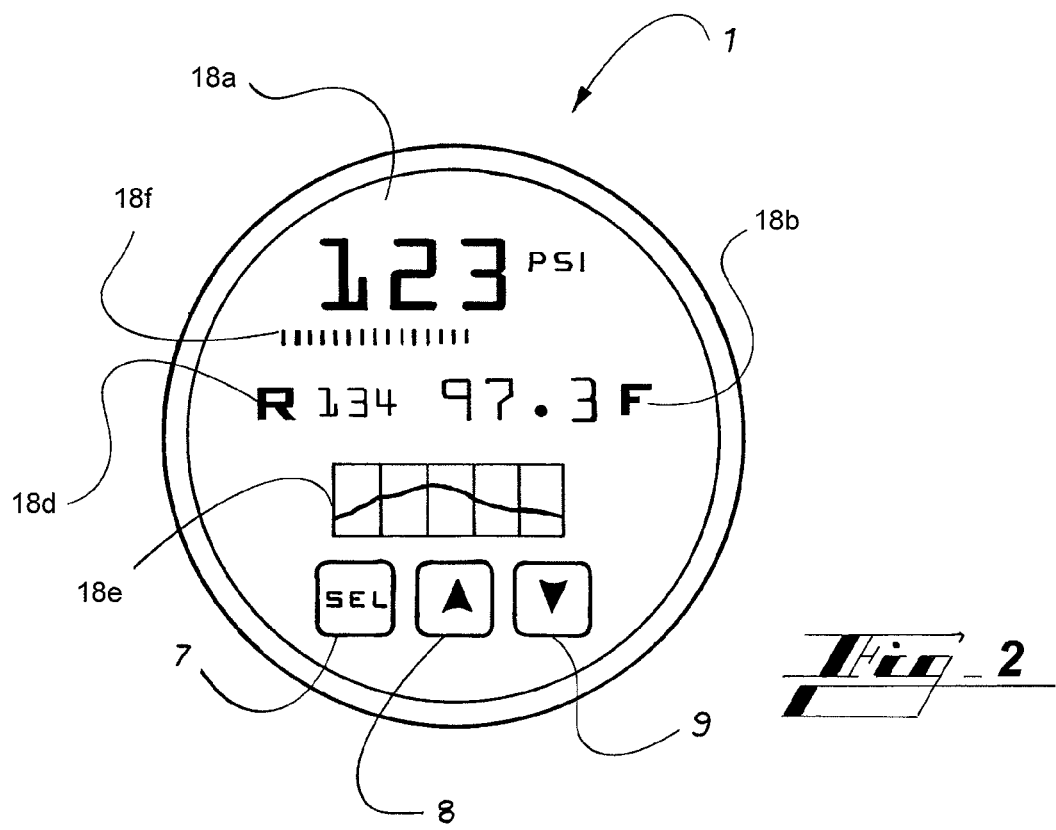
Fig_2

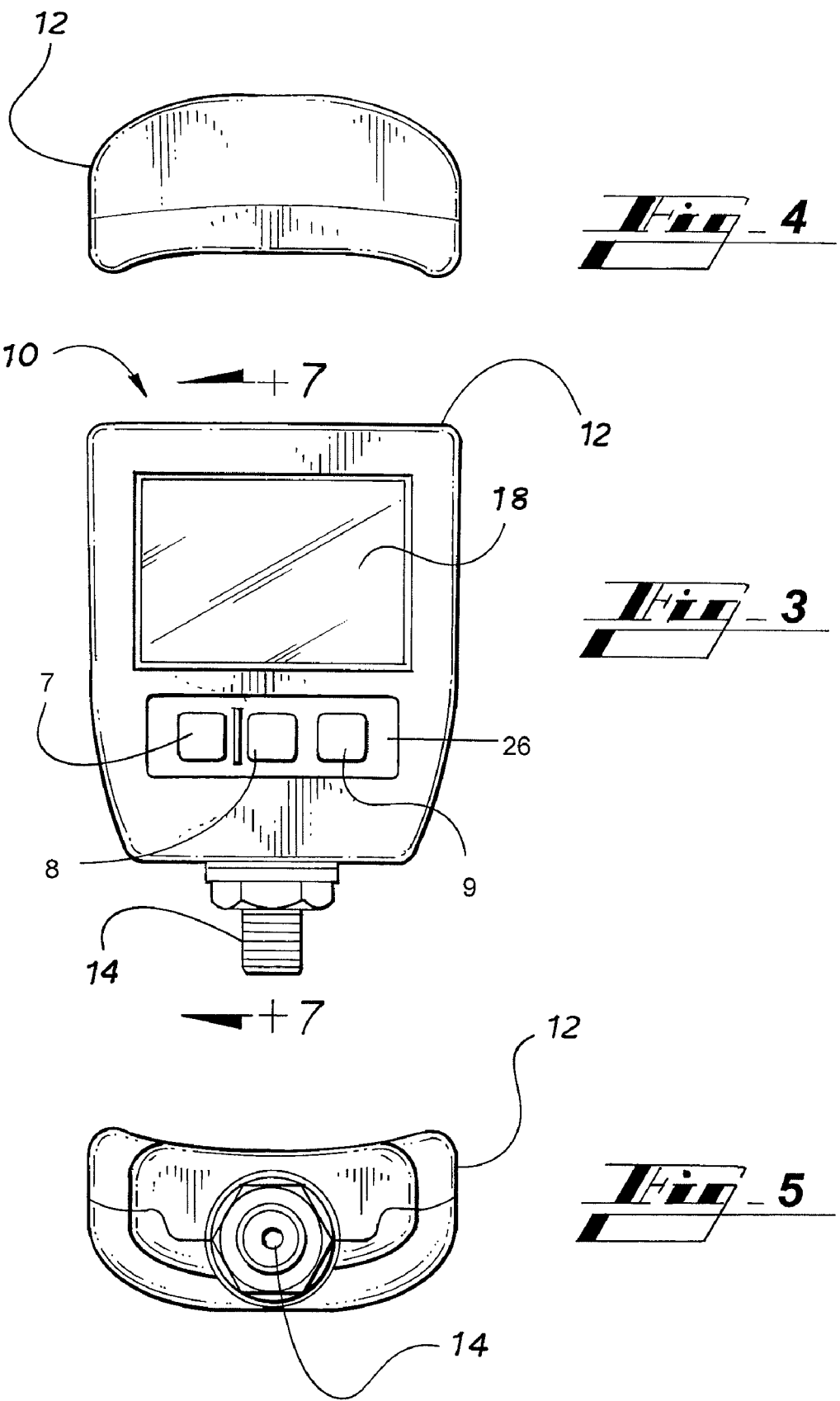

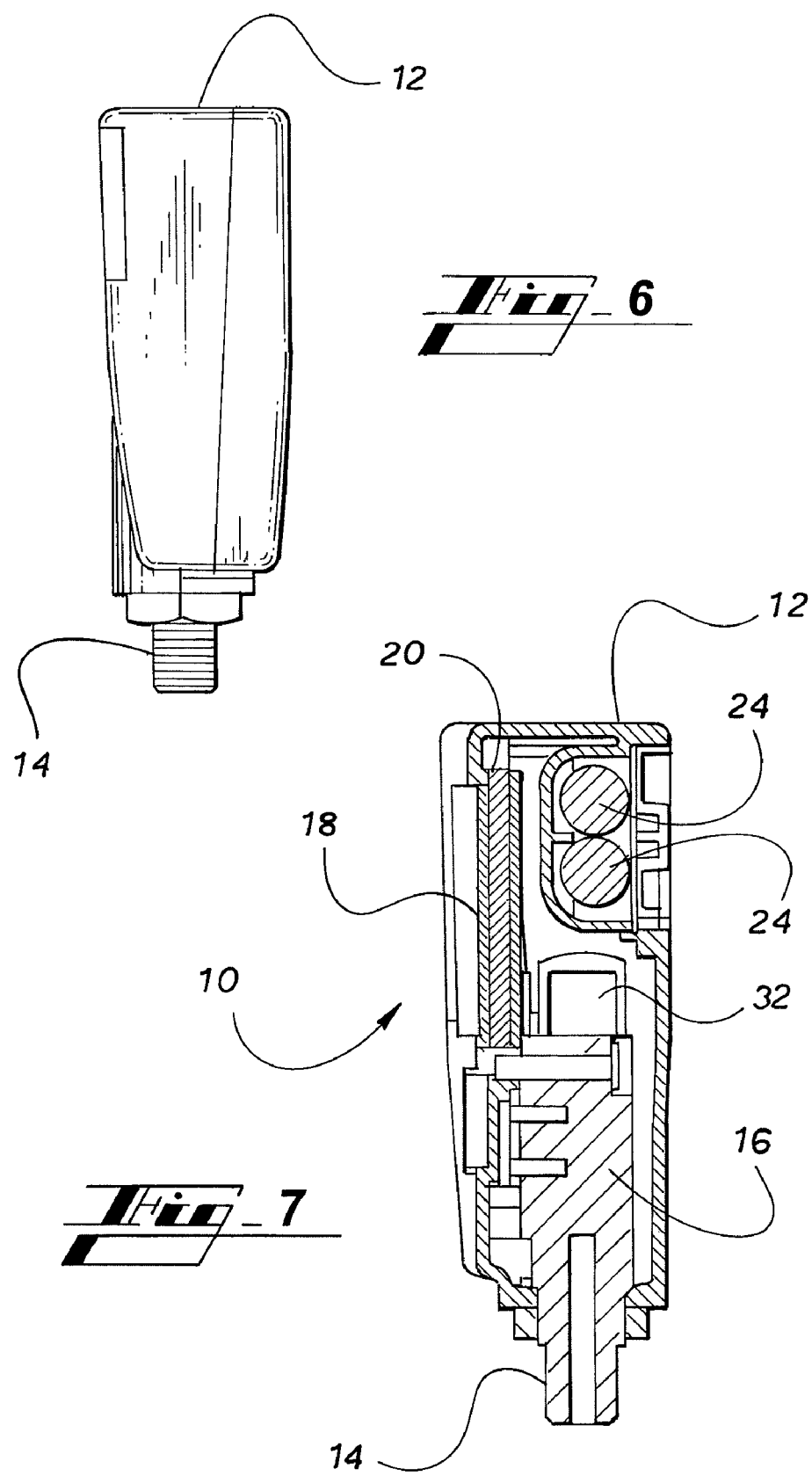

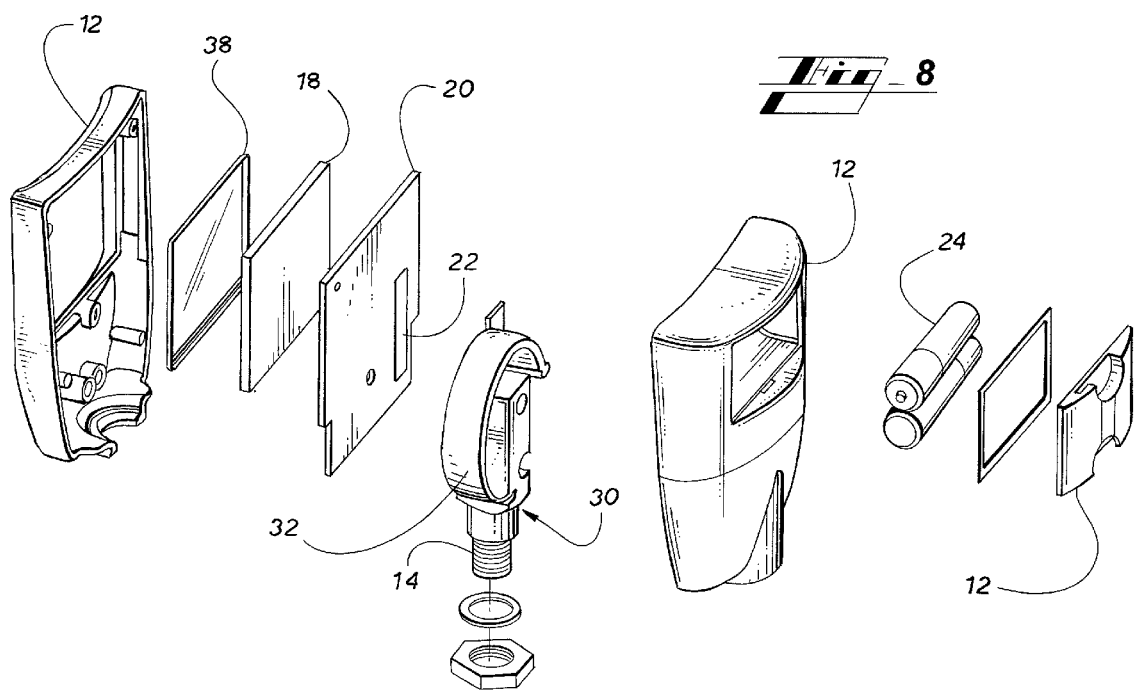

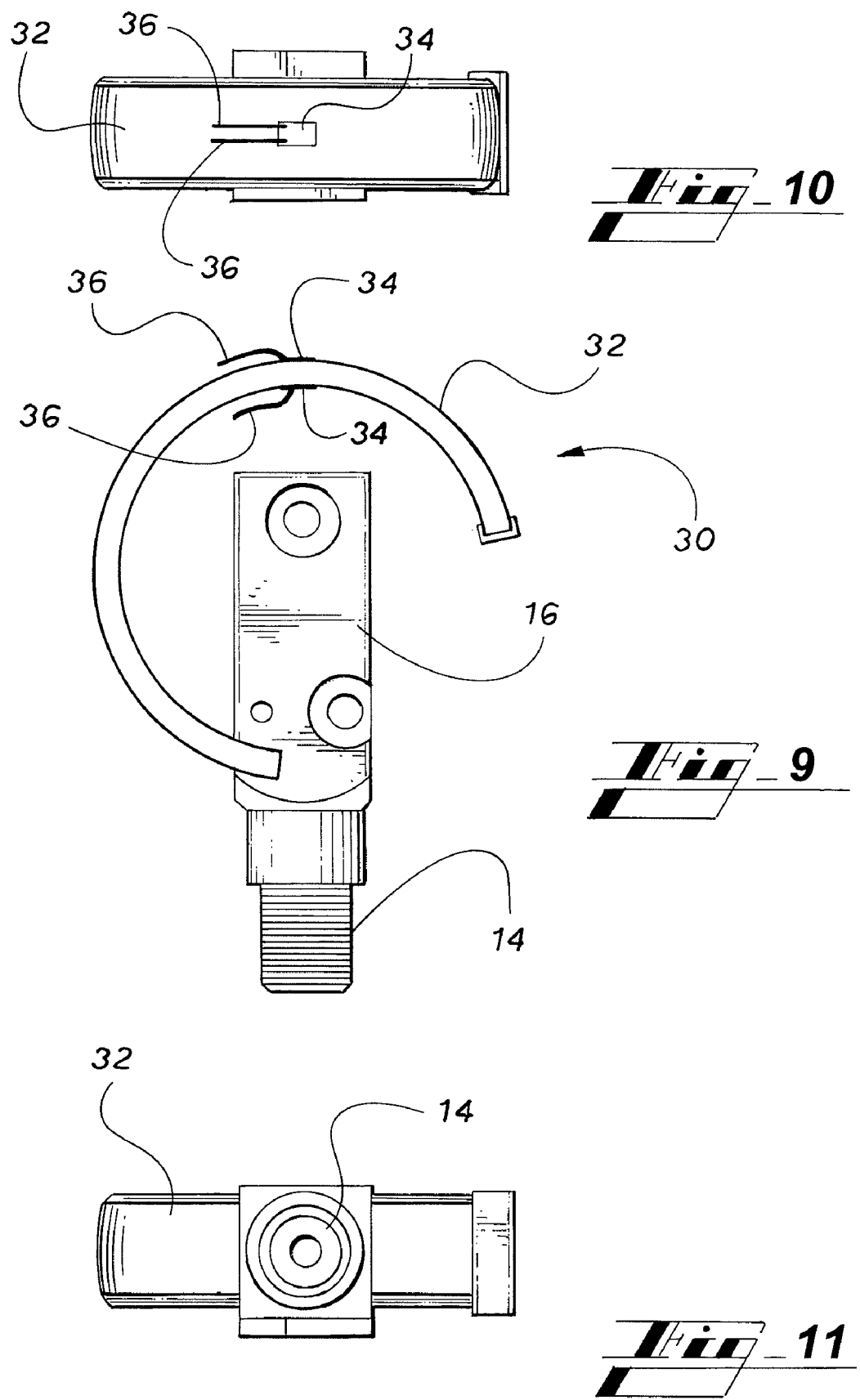

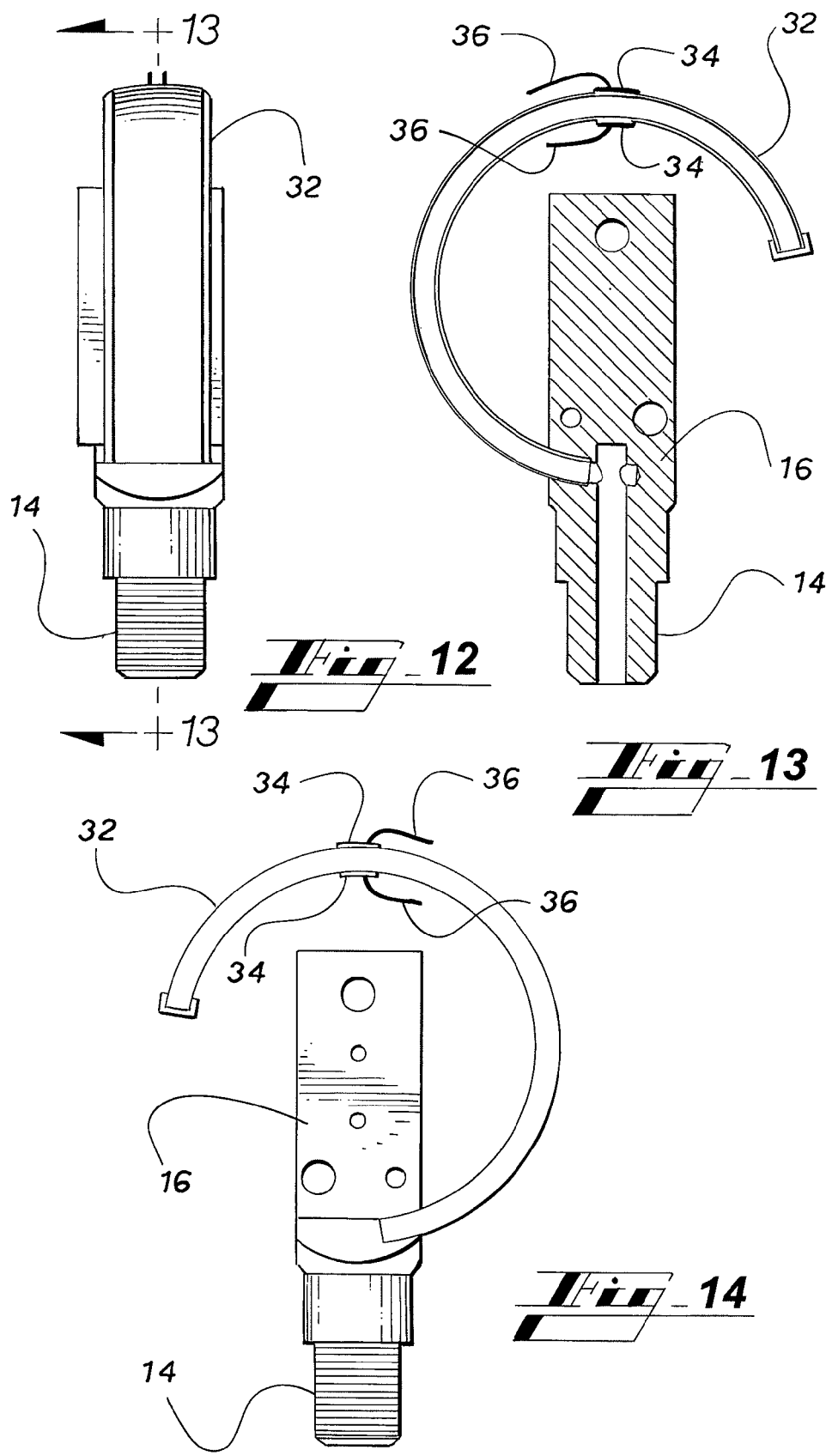

HEATING AND AIR CONDITIONING SERVICE GAUGE

CLAIM OF PRIORITY

This application is a continuation-in-part of U.S. patent application Ser. No. 12/206,958, filed Sep. 9, 2008 now U.S. Pat. No. 7,685,882, which is a continuation-in-part of U.S. patent application Ser. No. 11/743,374, filed May 2, 2007 now U.S. Pat. No. 7,437,941, which claims priority from U.S. Provisional Patent Application Ser. No. 60/746,720 filed on May 8, 2006, and which claims priority from U.S. Provisional Patent Application Ser. No. 61/026,812 filed on Feb. 7, 2008, which are incorporated herein in their entirety.

FIELD OF THE INVENTION

This invention relates to a service gauge used for installing and servicing an HVAC system.

BACKGROUND OF THE INVENTION

In order to install or service an HVAC system, HVAC service personnel must measure the HVAC system refrigerant pressure and from the refrigerant pressure determine the saturated vapor equivalent temperature for the particular refrigerant used in the HVAC system being installed or serviced. In addition, other parameters, such as trend lines for refrigerant pressure, trend lines for saturated vapor equivalent temperature, instantaneous refrigerant pressure bar graph, or superheat/sub-cool temperature of the refrigerant, may be useful in installing or servicing an HVAC system. Conventionally, the refrigerant pressure is measured with an analog pressure gauge and the saturated vapor equivalent temperature for the refrigerant is determined from the measured refrigerant pressure either by the use of lookup tables or by the use of correlated scales on the face of the analog pressure gauge.

A typical analog pressure gauge is mechanical and contains a bourdon tube. The bourdon tube is a mechanical transducer. The bourdon tube is a curved and partially flattened tube that tends to straighten out in proportion to internal pressure within the bourdon tube. The bourdon tube is connected to a series of watch-like gears (pointer gears) that rotate a needle shaft with an attached needle pointer to indicate the pressure on the dial of the analog pressure gauge. When the bourdon tube of the analog pressure gauge is connected to the refrigerant line, the refrigerant pressure within the bourdon tube causes the bourdon tube to straighten out so that the needle, mechanically connected to the bourdon tube through the gears, indicates the refrigerant pressure on the dial of the analog pressure gauge.

A conventional analog refrigerant pressure gauge 11 is shown in FIG. 1. When such an analog pressure gauge 11 is used to service an HVAC system, the main analog scale 13 of the analog pressure gauge 11 indicates pressure in PSI (pounds per square inch) or KPa (metric Kilo-Pascals). Additional inner analog scales (circular bands of numbers) 15 are also printed on the face of the analog pressure gauge 11. The additional inner scales 15 indicate the saturated vapor equivalent temperature for different refrigerants at the measured refrigerant pressure. Because of the limited space on the analog pressure gauge face, only two or three different inner scales for different refrigerants can fit onto the face of any one analog pressure gauge. FIG. 1 shows a typical prior art analog pressure gauge with only two saturated vapor equivalent temperature scales (refrigerants R-22 and R-134a) on its face.

The saturated vapor equivalent temperature scale of the analog pressure gauge is of importance to the HVAC technician because the saturated vapor equivalent temperature indicated on the analog pressure gauge for a particular refrigerant is used to ascertain the temperatures in parts of the system during charging, servicing, or monitoring. The correct saturated vapor equivalent temperature scale on the face of the analog pressure gauge must be matched to the type of refrigerant in the system. If the analog pressure gauge does not have a saturated vapor equivalent temperature scale that matches the refrigerant in the system being serviced, the technician must consult a table that converts the pressure read on the analog pressure gauge to the saturated vapor equivalent temperature. Because HVAC systems respond very slowly and because the pressure and the saturated vapor equivalent temperature must be continuously monitored during refrigerant charging, the use of a lookup chart is inconvenient, time consuming, and error prone.

SUMMARY OF THE INVENTION

In order to solve the problems of the prior art analog pressure gauges with limited space on the face for printing analog scales or other relevant information, the present invention comprises a service gauge with a digital display that can display refrigerant pressure and refrigerant saturated vapor equivalent temperature for a large number of different refrigerants as well as the instantaneous or time variation of the refrigerant pressure or the refrigerant saturated vapor equivalent temperature.

The service gauge of the present invention includes a sensor that measures changes in refrigerant pressure and produces an electronic pressure signal that is proportional to the measured refrigerant pressure. A battery powered microprocessor within the gauge receives the electronic pressure signal, converts the electronic pressure signal to a refrigerant pressure value in PSI or KPa, and digitally displays the refrigerant pressure value on the face of the gauge. In addition, the microprocessor can convert the refrigerant pressure value to a refrigerant saturated vapor equivalent temperature value (in Fahrenheit or Celsius) for the particular refrigerant being used in the HVAC system. Moreover, the service gauge of the present invention can produce an analog trend graph showing the change of refrigerant pressure or refrigerant saturated vapor equivalent temperature over time in order to give the technician a clear understanding of the operation of the system as the HVAC system progresses to a steady state condition. Further, the microprocessor can generate and display a bar graph that shows rapid fluctuations of the refrigerant pressure that can indicate a bad compressor valve or other system problems.

In order to measure the refrigerant pressure, in one embodiment of the service gauge of the present invention, the service gauge has a pressure sensor that includes at least one strain gauge mounted on the bourdon tube. In order to increase accuracy, two strain gauges, one mounted on the outside curvature of the bourdon tube and the other mounted on the inside curvature of the bourdon tube, may be used. As the bourdon tube straightens or curls in response to increasing or decreasing refrigerant pressure inside the bourdon tube, the strain gauge attached to the outside curvature of the bourdon tube and the strain gauge attached to the inside curvature of the bourdon tube both produce a strain gauge signals (electronic pressure signals) that are proportional to the flexing of the bourdon tube and therefore proportional to the refrigerant pressure. The strain gauge signals are connected to a battery powered microprocessor. The microprocessor uses the strain gauge signals to calculate the refrigerant pressure and related parameters, such as saturated vapor equivalent temperature for each individual refrigerant. The microprocessor then displays the refrigerant pressure and related parameters in a digital format on a display on the face of the digital service gauge.

In operation, the bourdon tube is similar to a bending beam. When a force is applied to a beam, the beam is subjected to combined bending and axial compressive stresses. The relationship between the applied force and the combined stress in the beam is linear. The stress in the beam results in corresponding strain of the beam material, and a strain gauge that is bonded to the beam experiences the same strain. Strain is the change in length divided by the original length. The relationship between stress and strain in the beam (and in the strain gauge) is linear. The electrical resistance of the strain gauge is directly proportional to the strain. As a result, the strain gauge signal is linear and is directly proportional to the load applied to the beam. The straightening and curling bourdon tube with a strain gauge attached operates in a fashion similar to a bending beam with an attached strain gauge.

In other embodiments of the present invention, the service gauge includes a combination of analog and digital displays for ease of operation. In such other embodiments, a bourdon tube is connected to a main needle pointer by means of conventional pointer gears and a main needle shaft so that the main needle pointer moves in response to the straightening and curling of the bourdon tube to indicate the pressure in the refrigerant line on the dial of the service gauge. In order to provide an auxiliary display, a disc-shaped magnet (diametrally magnetized) is fixed to the distal end of the needle shaft for rotation with the needle shaft. A absolute rotary position sensor is positioned adjacent to, but not touching, the disk-shaped magnet. As the needle shaft with the attached disk-shaped magnet rotates in response to changing pressure, the absolute rotary position sensor determines the angular rotation of the needle shaft and produces a rotary position output signal (either digital or analog). The rotary position output signal, which is representative of the pressure in the refrigerant line, is connected to a microprocessor. A temperature signal, which is representative of the temperature of the refrigerant, is also connected to the microprocessor. From the rotary position output signal and the temperature signal, the microprocessor can calculate or determine a number of parameters including, but not limited to, the saturated vapor equivalent temperature, a trend line (pressure or saturated vapor equivalent temperature), an instantaneous bar graph (pressure), or the super-heat/sub-cool temperature of the refrigerant. The output of the microprocessor may be connected to a digital display positioned on the front of the service gauge to display to the service technician the calculated parameters. Alternatively, the output of the microprocessor is connected to a stepper motor or servo motor to drive an auxiliary needle pointer on the face of the service gauge to indicate to the service technician the value of one of one or more of the calculated parameters.

Further objects, features and advantages will become apparent upon consideration of the following detailed description of the invention when taken in conjunction with the drawings are you and the appended claims.

BRIEF DESCRIPTION OF THE DRAWINGS

FIG. 1 is a front elevation view of a prior art analog service gauge with limited scales showing the saturated vapor equivalent temperature.

FIG. 2 is a front elevation view of a service gauge in accordance with a second embodiment of the present invention.

FIG. 3 is a front elevation view of a service gauge in accordance with a first embodiment of the present invention.

FIG. 4 is a top plan view of the service gauge in accordance with the first embodiment of the present invention.

FIG. 5 is a bottom plan view of the service gauge in accordance with the first embodiment of the present invention.

FIG. 6 is a side elevation view of the service gauge in accordance with the first embodiment of the present invention.

FIG. 7 is a section view of the service gauge in accordance with the first embodiment of the present invention as seen along line 7-7 of FIG. 3.

FIG. 8 is an exploded view of the service gauge in accordance with the first embodiment of the present invention.

FIG. 9 is a front elevation view of the internal components (pressure sensor) of the service gauge in accordance with the first three embodiments of the present invention.

FIG. 10 is a top elevation view of the internal components (pressure sensor) of the service gauge in accordance with the first three embodiments of the present invention.

FIG. 11 is a bottom elevation view of the internal components (pressure sensor) of the service gauge in accordance with the first three embodiments of the present invention.

FIG. 12 is a side elevation view of the internal components (pressure sensor) of the service gauge in accordance with the first three embodiments of the present invention.

FIG. 13 is a section elevation view of the internal components (pressure sensor) of the service gauge in accordance with the first three embodiments of the present invention as seen along line 13-13 of FIG. 12.

FIG. 14 is a back elevation view of the internal components (pressure sensor) of the service gauge in accordance with the first three embodiments of the present invention.

DETAILED DESCRIPTION OF THE PREFERRED EMBODIMENT

Figure 15:
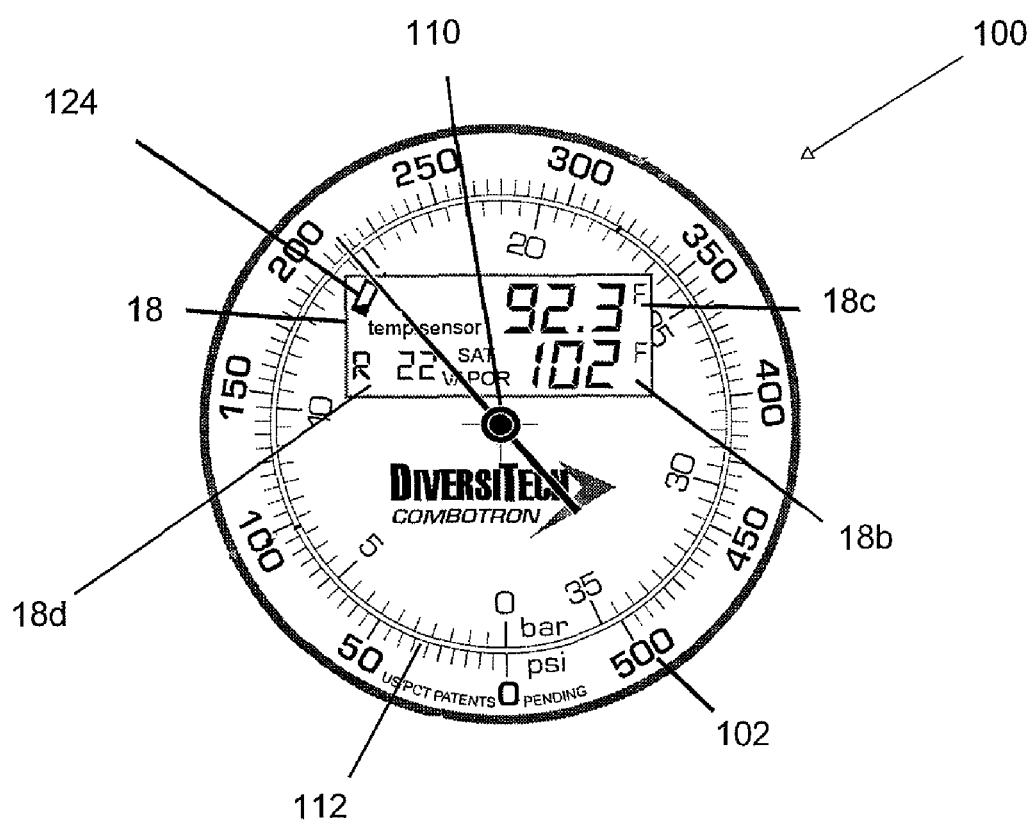
FIG. 15 is a front elevation view of a service gauge in accordance with a third embodiment of the present invention.
Figure 16:
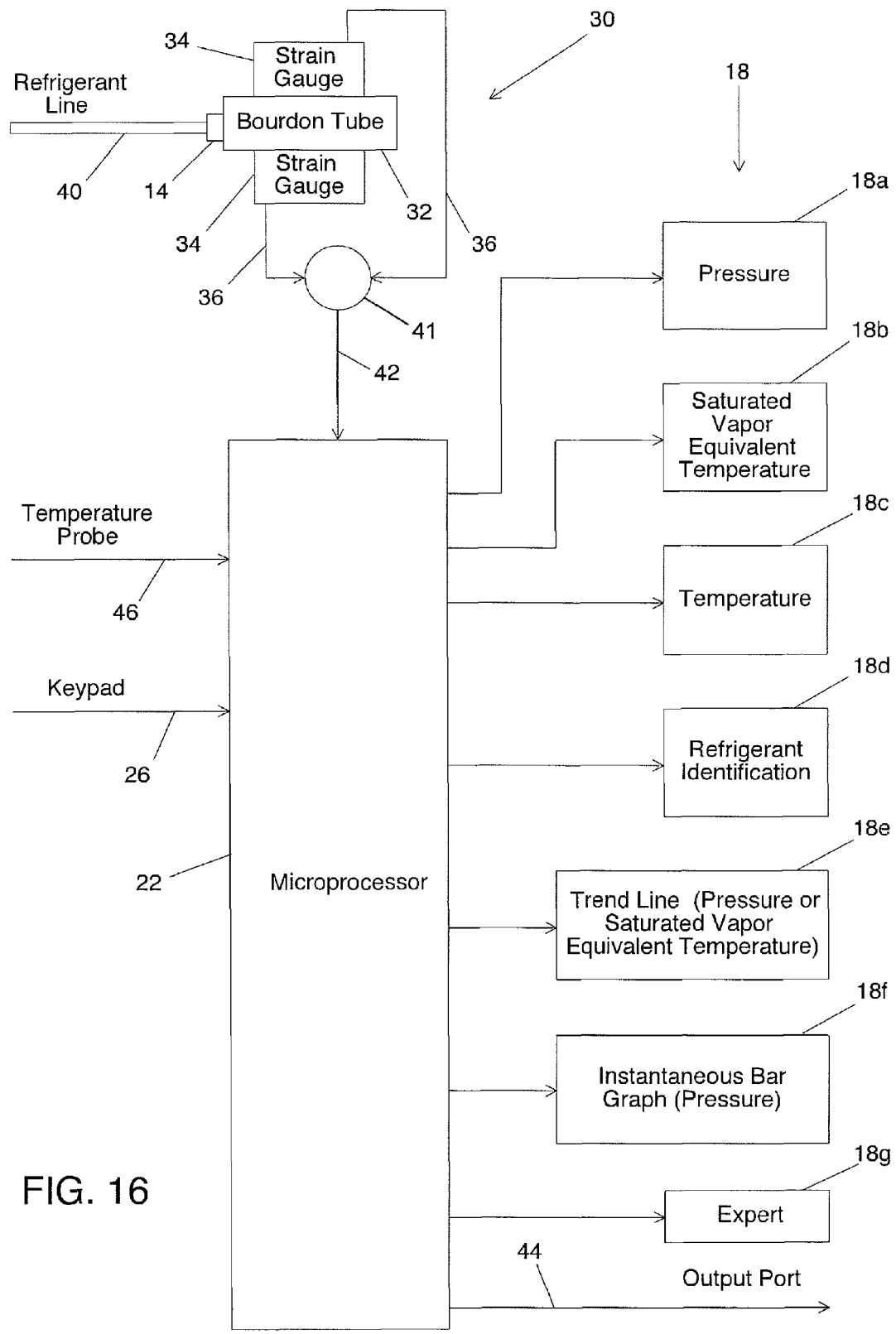
FIG. 16 is a block diagram of the service gauge in accordance with all five embodiments of the present invention.
Figure 17A:
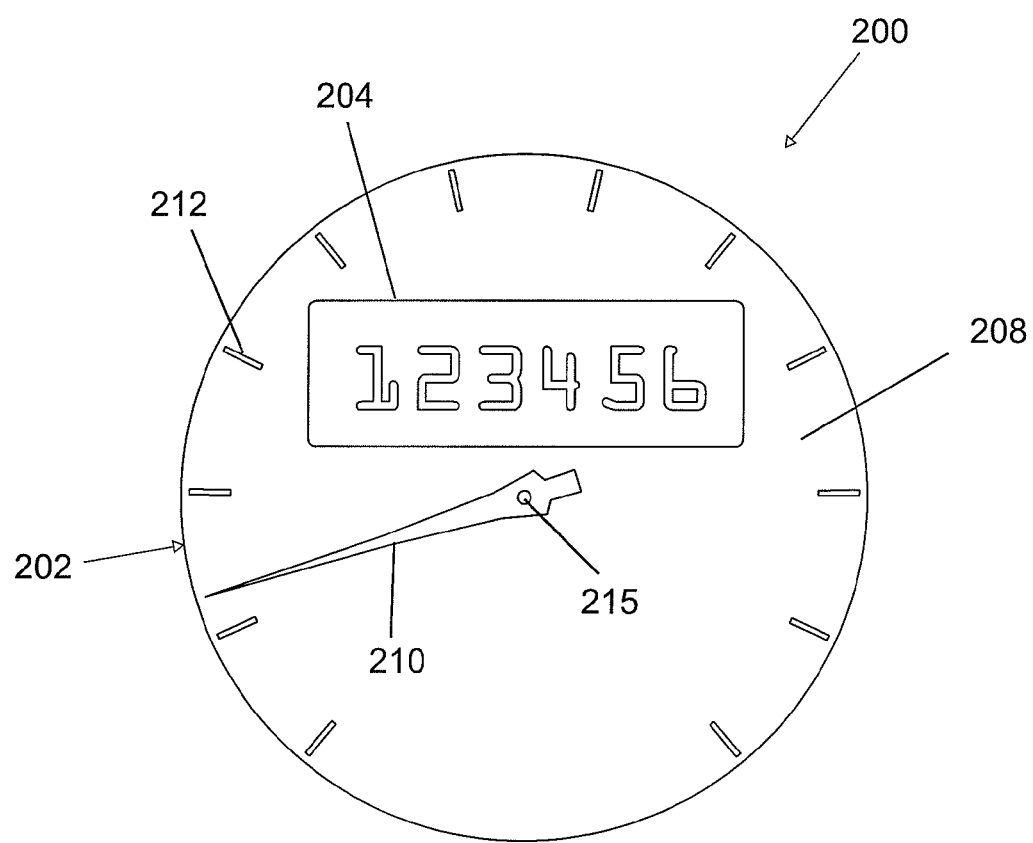
FIG. 17a is a front elevation view of a fourth embodiment of the service gauge in accordance with the present invention having a main analog display and an auxiliary digital display.
Figure 17B:
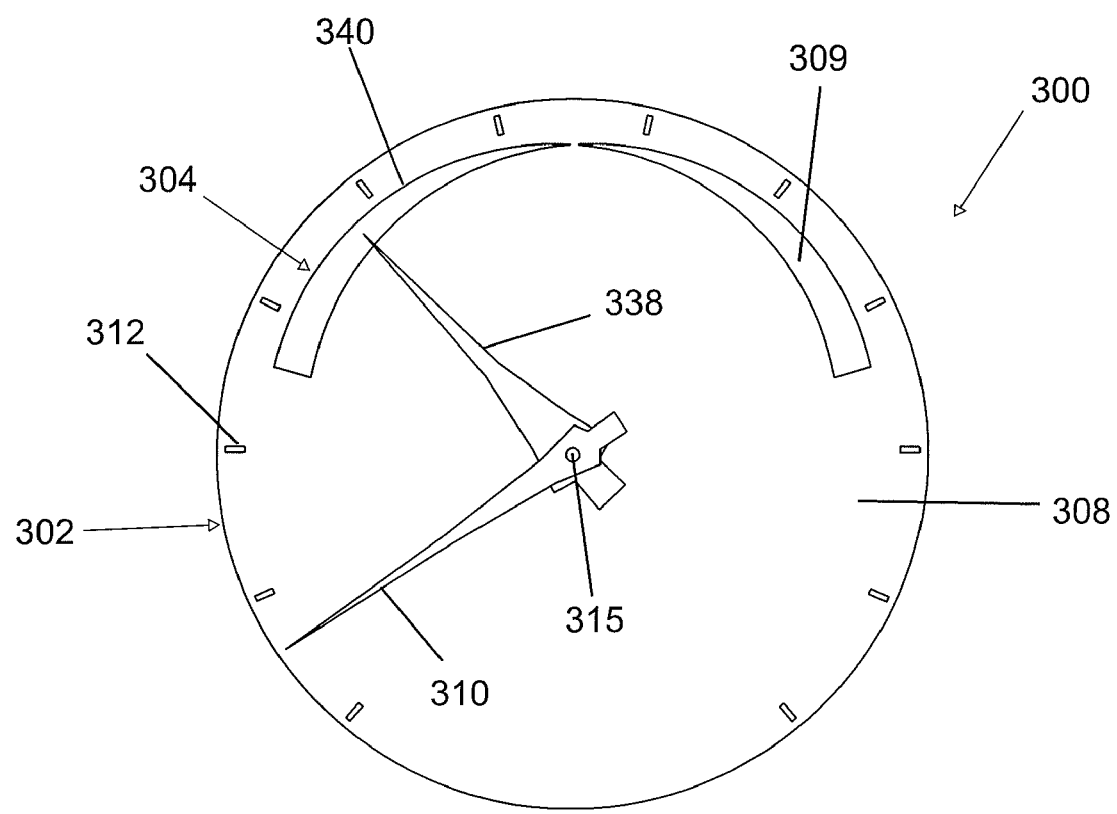
FIG. 17b is a front elevation view of a fifth embodiment of the service gauge in accordance with the present invention having a main analog display and an auxiliary analog display.
Figure 18A:
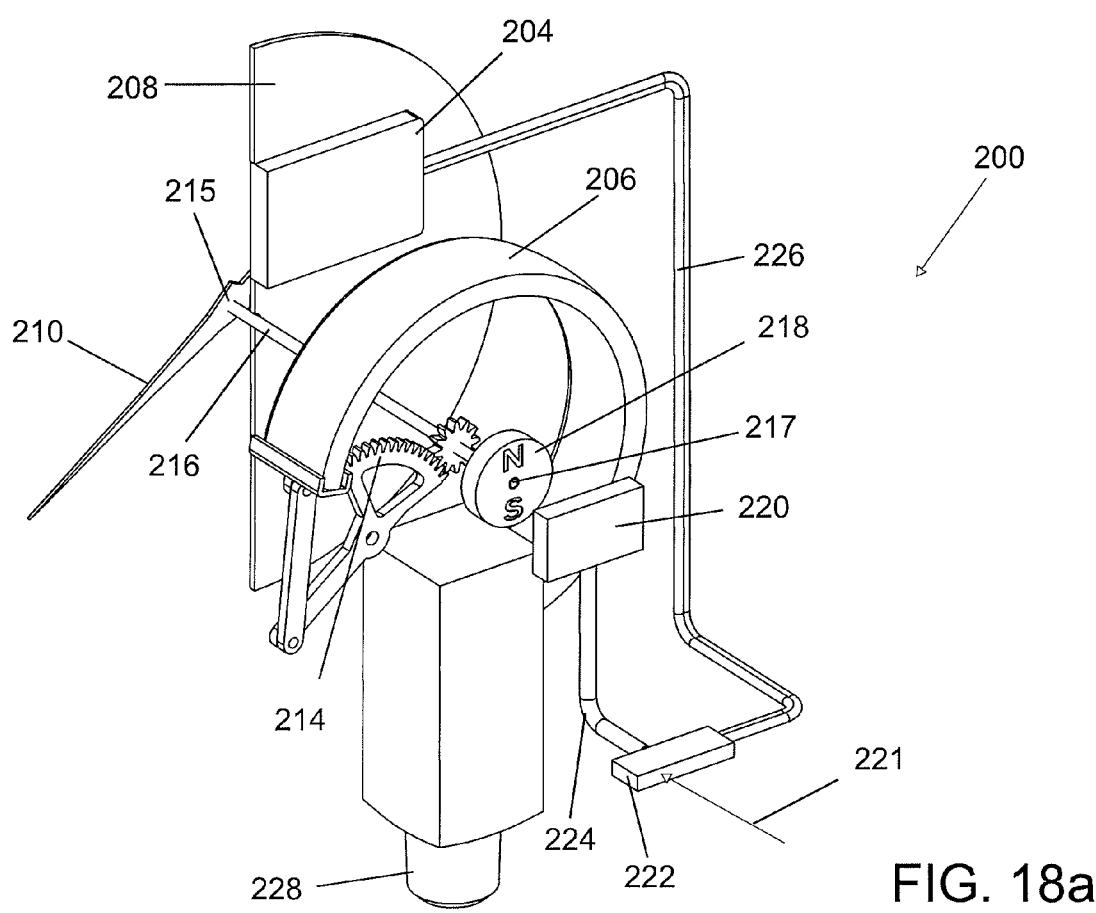
FIG. 18a is a schematic view of the internal components of the fourth embodiment of the service gauge in accordance with the present invention having a main analog display and an auxiliary digital display.
Figure 18B:
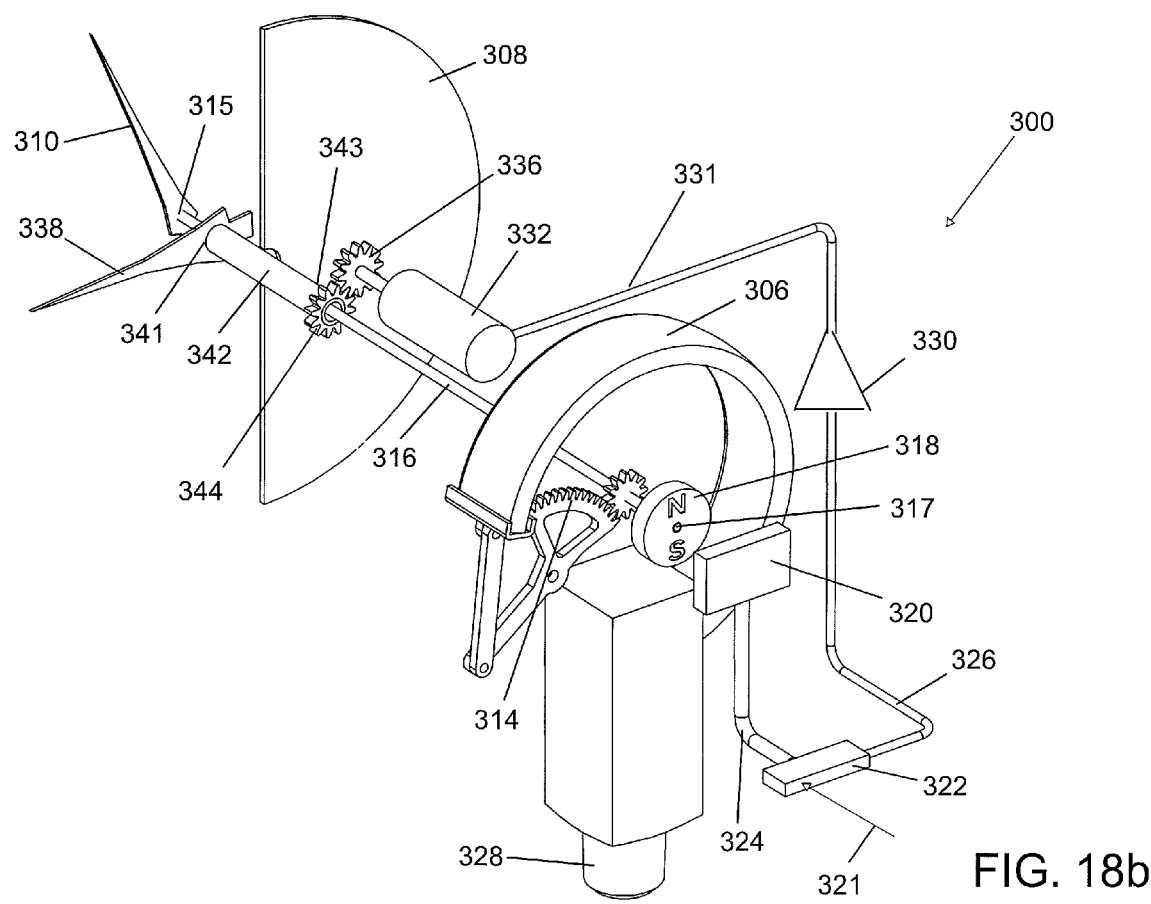
FIG. 18b is a schematic view of the internal components of the fifth embodiment of the service gauge in accordance with the present invention having a main analog display and an auxiliary analog display.

FIGS. 3-8 show a first embodiment of the present invention. FIG. 2 shows a second embodiment of the present invention. FIG. 15 shows a third embodiment of the present invention. FIGS. 9-14 show a pressure sensor that is common to the first three embodiments of the present invention. FIG. 16 shows a functional block diagram that is common to the first three embodiments of the present invention, except for the additional expert functions that are part of the first embodiment of the present invention. FIGS. 17a and 18a show a fourth embodiment of the present invention. FIGS. 17b and 18b show a fifth embodiment of the present invention.

Turning to FIGS. 3-8, a digital service gauge 10 in accordance with a first embodiment of the present invention comprises a case 12, a pressure connector 14, a pressure manifold 16 (FIG. 7), a display 18 (with protective window 38), a microprocessor 22 (FIGS. 8 and 16), and a pressure sensor 30. The display 18 is an LED display that may display all of the functions of the service gauge 10 including without limit display functions 18a-g of FIG. 16.

With reference to FIGS. 3-8 and 16, the pressure sensor 30, which will be described in greater detail below, is connected to a refrigerant line 40 (FIG. 16) of an HVAC system (not shown) via the pressure manifold 16 and the pressure connector 14 (FIG. 7). The pressure sensor 30 produces an electronic pressure signal 42 (FIG. 16) that is proportional to the refrigerant pressure in the refrigerant line 40 of the HVAC system. The electronic pressure signal 42 (FIG. 16) produced by the pressure sensor 30 is connected to the microprocessor 22, which is powered by batteries 24 (FIG. 8). The microprocessor 22 and the LED display 18 are mounted on printed circuit board 20 (FIG. 8) that provides the necessary interconnection between components related to the operation of the microprocessor 22 and the display 18. The microprocessor 22, including related electronics on the printed circuit board 20 and related firmware and software, converts the electronic pressure signal 42 to a refrigerant pressure value that is shown on the display 18 as display function 18a (FIG. 16). For a particular refrigerant in the HVAC system, the microprocessor 22 converts the electronic pressure signal 42 to a saturated vapor equivalent temperature value that is likewise shown on of the display 18 as display function 18b (FIG. 16). The microprocessor 22 simultaneously displays the identification of the particular refrigerant on the display 18 as display function 18d (FIG. 16). The microprocessor 22 is programmed to calculate the saturated vapor equivalent temperature for a number of different refrigerants used in HVAC systems.

From the refrigerant pressure value, the microprocessor 22 can also calculate and render a bar graph of the instantaneous refrigerant pressure on the display 18 as the display function 18f (FIG. 16). Also, the microprocessor 22 can calculate and render on the display 18 as the trend line display function 18e a time lapsed refrigerant pressure or a time lapsed refrigerant saturated vapor equivalent temperature for a preselected time period.

The various functions for the service gauge 10 are selected by means of a keypad 26 on the face of the service gauge 10 (FIG. 3). The keypad 26 may include a function select button 7, an up button 8, and a down button 9 that are connected to the microprocessor 22. The function select button 7, for example, may select the refrigerant display function 18d, and by manipulating the up button 8 or the down button 9, the user can select the appropriate refrigerant in the HVAC system being installed or service. Similarly, the user can manipulate the function select button 7, the up button 8, and the down button 9 to toggle the pressure display function 18a between PSI and the KPa units of measurement. Likewise the saturated vapor equivalent temperature display function 18b can be toggled between Fahrenheit and Celsius readings using the function select button 7, the up button 8, and the down button 9. Depending on the room available on the particular gauge, the keypad 26 could have more keys for selecting functions and manipulating the display 18.

The service gauge 10 may include a wired or wireless output port 44 (FIG. 16) for connection to a computer, PDA, cell phone, or the like for capture of gauge data for storage or further analysis.

With continuing reference to (FIG. 16), the refrigerant display function 18d shows the refrigerant type for the HVAC system being serviced. The technician selects the refrigerant type using the keypad 26, and the microprocessor in the service gauge 10 calculates the saturated vapor equivalent temperature using an internal lookup table of all popular refrigerants and displays the saturated vapor equivalent temperature in degrees (Fahrenheit or Celsius) on the saturated vapor equivalent temperature display 18b.

The bar graph function 18f on the display 18 shows rapid pressure fluctuations that can indicate a bad compressor valve or other system problems. The time lapse display function 18e on the display 18 renders a trend line that shows a time lapsed view of the refrigerant pressure or the refrigerant saturated vapor equivalent temperature. Total trend time shown on the time lapse display 18e can be selected, for example, in 3 ranges of 5 minutes, 30 minutes, and 1 hour using the function select button 7, the up button 8, and the down button 9.

An external temperature probe 46 (FIG. 16) can be connected to the gauge 10 of the present invention in order to measure and display refrigerant temperature, super-heat, or sub-cool system parameters as display function 18c on display 18.

The pressure sensor 30 is best understood with reference to FIGS. 9-14. The pressure sensor 30 comprises a bourdon tube 32 with strain gauges 34 attached to the top, outside curvature and the bottom, inside curvature of the bourdon tube 32 by any suitable attachment method. The strain gauges 34 each have strain gauge outputs 36. The strain gauge outputs 36 of each strain gauge 34 are connected to the microprocessor 22 via the printed circuit board 20.

A suitable strain gauge for the strain gauges 34 includes a strain gauge such as:

| MODEL | GRID DIM | BACKING DIM |
| --- | --- | --- |
| BF350-3EB | 2.25 × 2.65 | 9.2 × 7.7 |
| ZF1000-3EB | 2.25 × 2.65 | 9.2 × 7.7 | sold by Dongguan South China Sea Electronic Co., Ltd., Dongguan City, Guangdong Province, China. The use of the two discrete strain gauges 34 mounted on the inside curvature and the outside curvature of the bourdon tube 32 provides ambient temperature compensation. Alternatively, a single strain gauge with built in ambient temperature compensation could be used.

In operation and with continuing reference to FIGS. 3-14 and 16, the pressure connector 14 of the gauge 10 is attached to the refrigerant line 40 (FIG. 16) of the HVAC system. The refrigerant pressure within the refrigerant line is connected through the pressure connector 14 and the pressure manifold 16 to the bourdon tube 32. The internal pressure within the bourdon tube 32 causes the bourdon tube to straighten. As the bourdon tube 32 straightens, the strain gauges 34 attached on the inside curvature and on the outside curvature of the bourdon tube 32 measure the strain experienced by the bourdon tube 32. The resulting strain experienced by each of the strain gauges 34 produces an electronic pressure signal at the strain gauge output 36 of each of the strain gauges 34. The electronic strain gauge signals on each of the strain gauge outputs

36 are each proportional to the strain experienced by the strain gauges 34. When the strain signals are combined by summing circuit 41 (FIG. 16), the strain gauge signals produce the electronic pressure signal 42 that is proportional to the refrigerant pressure present at the pressure connector 14. The microprocessor 22 uses the electronic pressure signal 42 to calculate and to display, as display function 18a, the refrigerant pressure of the refrigerant in the refrigerant line 40 of the HVAC system. The microprocessor 22 also calculates and displays, as display function 18b, the saturated vapor equivalent temperature for the particular refrigerant used by the HVAC system. As previously described, the microprocessor 22 can also use the electronic pressure signal 42 resulting from combining the strain gauge signals at the outputs 36 of the strain gauges 34 to calculate and display other parameters relating to the operation of the HVAC system.

The combination of the bourdon tube 32 and the strain gauges 34 provides a low-cost yet highly accurate means of generating an electronic pressure signal 42 that is proportional to the refrigerant pressure in the HVAC system.

FIG. 2 shows an electronic service gauge 1 in accordance with a second embodiment of the present invention. The size and shape of the service gauge 1 is similar to the conventional prior art gauge shown in FIG. 1. The service gauge 1 comprises an internal pressure sensor (such as pressure sensor 30, FIG. 8, and described above) that is in communication with a refrigerant line 40 of the HVAC system (not shown). As previously described, the pressure sensor 30 produces an electronic pressure signal 42 that is proportional to the refrigerant pressure in the refrigerant line of the HVAC system. With continuing reference to (FIG. 2), the microprocessor 22, including related electronics and software, converts the electronic pressure signal 42 to a refrigerant pressure value that is shown on the pressure display 18 as display function 18a. For a particular refrigerant in the HVAC system, the microprocessor 22 converts the electronic pressure signal 42 to a refrigerant saturated vapor equivalent temperature value that is likewise shown on of the saturated vapor equivalent temperature display 18 as display function 18b.

From the refrigerant pressure value, the microprocessor 22 can also calculate and render a bar graph of the instantaneous refrigerant pressure on a bar graph display 18 as display function 18f (FIG. 2). Also, the microprocessor can calculate and render a time line for a time lapsed refrigerant pressure or a time lapsed refrigerant saturated vapor equivalent temperature for a preselected time period on a time lapse display 18 as display function 18e. In addition, the service gauge 1 has a refrigerant display function 18d that shows the refrigerant that is in the HVAC system being installed or service. With continuing reference to (FIG. 2), the service gauge 1 also has a select button 7, that selects each of the display functions, up button 8, and down button 9. The select button 7, for example, may select the refrigerant display function 18d, and by manipulating the up button 8 or the down button 9, the user can selectively appropriate refrigerant in the HVAC system being installed or service. Similarly, the user can manipulate the select button 7, the up button 8, and the down button 9 to toggle the pressure display function 18a between PSI and the KPa units of measurement. Likewise the saturated vapor equivalent temperature display function 18b can be toggled between Fahrenheit and Celsius readings.

The service gauge 1 in FIG. 2 can also include an external temperature probe 46 (FIG. 16) that produces an electronic temperature signal that is proportional to the refrigerant temperature sensed by the temperature probe. From the electronic temperature signal, the microprocessor can calculate and render a temperature value on the display 18.

Further, the service gauge 1 in FIG. 2 may include an wired or wireless output port for connection to a computer, PDA, cell phone, or the like for capture of gauge data for storage or further analysis.

Turning to FIG. 15, a third embodiment of the present invention comprises a service gauge 100 that has an analog display 102 including a needle 110 as well as a digital display 18. Both displays are driven by the same internal bourdon tube 32. The needle 110 of the analog display 102 is driven by the bourdon tube 32 with attached pointer gears in conventional fashion, and the digital display 104 is driven by the bourdon tube 32 with attached strain gauges 34 as previously described in connection with the first embodiment shown if FIGS. 3-14.

As shown in FIG. 15, the analog display 102 includes the needle 110 and an analog scale 112. The analog display 102 displays the pressure of the refrigerant either in PSI or Bar. The needle 110 is driven by the internal bourdon tube that is connected to the pointer gears attached to the burden tube and the needle 110. As the bourdon tube straightens in response to increased internal pressure, the attached pointer gears move the needle 110 clockwise. Similarly as the bourdon tube curls in response to reduced internal pressure, the attached pointer gears move the needle 110 counterclockwise.

The digital display 18 displays the saturated vapor equivalent temperature function 18b and the measured refrigerant temperature function 18c for the particular refrigerant in the HVAC system being installed or serviced. Particularly, the pressure in the HVAC system is sensed by the bourdon tube 32 with its attached strain gauges 34 as previously described in connection with FIGS. 3-14. As the bourdon tube 32 straightens and curls in response to increased and decreased internal pressure, the attached strain gauges 34 produce an electronic pressure signal 42 (FIG. 16) that is proportional to the measured refrigerant pressure. The electronic pressure signal 42 is connected to the internal microprocessor 22. The microprocessor 22 converts the electronic pressure signal 42 into the saturated vapor equivalent temperature for the particular selected refrigerant and displays the saturated vapor equivalent temperature function 18b (FIG. 15) for that measured pressure.

In addition, the service gauge 100 has a separate temperature probe (not shown) which delivers a electronic temperature signal to the microprocessor. The electronic temperature signal is proportional to the measured refrigerant temperature, and the measured refrigerant temperature function 18c is displayed by digital display 18.

The service gauge 100 also has a low battery indicator 124 to alert the user that the battery is low. Further, the service gauge 100 is backlit so that both the analog display 102 and the digital display 18 are readable day or night.

Because the service gauge of the present invention includes a microprocessor 22, expert/knowledge base software can be installed in the microprocessor that will the service technician in installing or repairing an HVAC system with a step-by-step set of instructions keyed to the parameters being measured by the service gauge. As the expert/knowledge base software generates instructions for the service technician, those instructions are displayed as expert function 18g (FIG. 16).

Turning to FIGS. 17a and 18a, a fourth embodiment of the present invention is shown. Particularly, 17a shows a service gauge 200 having a main analog display 202 and an auxiliary digital display 204. The main analog display 202 comprises an analog scale 212 on a dial face 208 and a main needle pointer 210. The main analog display 202 displays the refrigerant pressure in a refrigeration line, such as refrigeration line 40 shown in FIG. 16, to which the service gauge 200 is connected via a pressure connector 228. The auxiliary digital display 204 can be used to display a number of parameters, including, but not limited to, saturated vapor equivalent temperature, trend lines for pressure or saturated vapor equivalent temperature, instantaneous bar graph (pressure), super-heat/sub-cool temperature, or expert information to assist the user of the service gauge 200.

The construction of the service gauge 200 is shown schematically in FIG. 18a. The service gauge 200 has a bourdon tube 206 connected by means of the pressure connector 228 to the refrigerant line 40 of an HVAC system. Pointer gears 214 operatively connect the bourdon tube 206 to a needle shaft 216 that is mounted for rotation within the service gauge 200. The needle shaft 216 has a proximal end 215 and a distal end 217. The needle pointer 210 is fixed to the proximal end 215 of the needle shaft 216, and a disc-shaped magnet 218 (diametrally magnetized) is fixed to the distal end 217 of the needle shaft 216. An absolute rotary position sensor 220, in the form of an integrated circuit, is positioned adjacent to, but not in contact with, the disc-shaped magnet 218. The output of the position sensor 220 on line 224 is connected to a microprocessor 222. In addition, the microprocessor 222 has a temperature input 221 that is connected to a temperature probe (not shown) for measuring the temperature of the refrigerant. The temperature probe may either be separate from the service gauge 200 and connected to the microprocessor 222 through an input port (not shown) on the service gauge 200, or the temperature probe may be integrated into the service gauge 200 adjacent the pressure connector 228 to measure the temperature of the refrigerant as the refrigerant enters the service gauge 200. The output of the microprocessor 222 on line 226 is connected to the digital display 204.

In operation, and with continuing reference to FIG. 18a, the pressure connector 228 of the gauge 200 is attached to the refrigerant line 40 (FIG. 16) of the HVAC system. The refrigerant pressure within the refrigerant line 40 is connected through the pressure connector 228 to the inside of the bourdon tube 206. The internal pressure within the bourdon tube 206 causes the bourdon tube 206 to straighten. As the bourdon tube 206 straightens, the pointer gears 214, attached to the burden tube 206 and to the needle shaft 216, rotate causing the needle shaft 216 to rotate. The pointer gears 214 are selected so that the needle shaft 216 rotates in a predetermined linear relationship to the straightening of the bourdon tube 206 and therefore in a predetermined linear relationship to the refrigerant pressure at the pressure connector 228 and in the refrigerant line 40. As the needle shaft 216 rotates in response to the straightening or curling of the bourdon tube 206, the needle pointer 210, fixed to the proximal end 215 of the needle shaft 216, rotates with the needle shaft 216 and thereby moves along the analog scale 212 on the dial face 208 of the service gauge 200 to indicate the refrigerant pressure in the refrigerant line 40. Such operation of the bourdon tube 206 to drive of the needle pointer 210 of the analog display 202 of the service gauge 200 is conventional in the art.

As the needle shaft 216 rotates in response to the straightening and curling of the bourdon tube 206, the disc-shaped magnet 218, fixed to the distal end 217 of the needle shaft 216, rotates. The disc-shaped magnet 218 is position adjacent to the rotary position sensor 220. The rotary position sensor 220 determines the absolute rotary position of the needle shaft 216 by sensing the rotary position of the poles of the disc-shaped magnet 218. The rotary position sensor 220 converts the rotary position of the magnet 218 into a rotary position output signal on output line 224. The rotary position sensor 220 may be implemented by the MLX90316 Absolute Rotary Position Sensor IC sold by Melexis Microelectronic Systems, Rozendaalstraat 12, B-8900 Ieper, Belgium. An absolute rotary position sensor, such as the MLX90316 Absolute Rotary Position Sensor IC, is a CMOS Hall sensor that determines the angular position of a magnetic field extending parallel to the surface of the integrated circuit case. An integrated magneto concentrator (IMC) within the integrated circuit concentrates the applied magnetic flux density parallel to the surface of the case of the integrated circuit. At the boundaries of the IMC structure, an orthogonal component proportional to the applied flux density can be measured by two pairs of conventional planar Hall plates located orthogonally under the IMC and for each of the two directions parallel with the surface of the case of the integrated circuit (X and Y). The first part of the sensor encodes a mechanical angle into two sinusoidal signals with 90° phase shift (sine and cosine). The two signals (Vx & Vy), which are proportional to the magnetic field, are amplified, sampled, and converted in digital signals. The two signals are then used to calculate the angle through an arctangent function applied to the ratio Vy/Vx. The calculated angle, represented by a digital value, can be converted back into an analog signal through a D/A converter. Consequently, the rotary position output signal on output line 224 may be either a digital signal or an analog signal and is proportional to the pressure at the pressure connector 228 of the service gauge 200.

The microprocessor 222 receives the rotary position output signal on line 224 and the temperature on temperature input 221. From the rotary position output signal on line 224, indicative of the pressure of the refrigerant, and from the temperature of the refrigerant, the microprocessor 222 can calculate various parameters including, but not limited to, the saturated vapor equivalent temperature, a trend line (pressure or saturated vapor equivalent temperature), an instantaneous bar graph (pressure), or the super-heat/sub-cool temperature of the refrigerant. Once calculated, the parameters can then be connected to the digital display 204 by means of microprocessor output line 226 for display on the digital display 204.

Turning to FIGS. 17b and 18b, a fifth embodiment of the present invention is shown. Particularly, 17b shows a service gauge 300 having a main analog display 302 and an auxiliary analog display 304. The main analog display 302 comprises an analog scale 312 on a dial face 308 and a main needle pointer 310. The main analog display 302 displays the refrigerant pressure in a refrigeration line, such as refrigeration line 40 shown in FIG. 16, to which the service gauge 300 is connected via a pressure connector 328. The auxiliary analog display 304 comprises an analog scale 340 on a dial face 309 and an auxiliary needle pointer 338. The auxiliary analog display 304 can be used to display a number of parameters, including, but not limited to, saturated vapor equivalent temperature or super-heat/sub-cool temperature to assist the user of the service gauge 300.

The construction of the service gauge 300 is shown schematically in FIG. 18b. The service gauge 300 has a bourdon tube 306 connected by means of the pressure connector 328 to the refrigerant line 40 of an HVAC system. Main pointer gears 314 operatively connect the bourdon tube 306 to a main needle shaft 316 that is mounted for rotation within the service gauge 300. The main needle shaft 316 has a proximal end 315 and a distal end 317. The main needle pointer 310 is fixed to the proximal end 315 of the main needle shaft 316, and a disc-shaped magnet 318 (diametrically magnetized) is fixed to the distal end 317 of the main needle shaft 316. An absolute rotary position sensor 320, in the form of an integrated circuit, is positioned adjacent to, but not in contact with, the disc-shaped magnet 318. The output of the position sensor 320 on line 324 is connected to a microprocessor 322. In addition, the microprocessor 322 has a temperature input 321 that is connected to a temperature probe (not shown) for measuring the temperature of the refrigerant. The temperature probe may either be separate from the service gauge 300 and connected to the microprocessor 322 through an input port (not shown) on the service gauge 300, or the temperature probe may be integrated into the service gauge 300 adjacent the pressure connector 328 to measure the temperature of the refrigerant as the refrigerant enters the service gauge 300. The output of the microprocessor 322 on line 326 is connected to a stepper motor (or servomotor) 332 by means of a driver circuit 330.

The service gauge 300 also includes a auxiliary needle shaft 242 that is coaxially disposed about the main needle shaft 316 for independent rotation therefrom. The auxiliary needle shaft 242 has a proximal end 241 and a distal end 343. The auxiliary needle pointer 338 is fixed to the proximal end 341, and an auxiliary needle shaft gear 344 is fixed to the distal end 343 of the auxiliary needle shaft 342. The stepper motor 332 has a stepper motor drive shaft 334 with a stepper motor drive gear 336 attached thereto. The stepper motor drive gear 336 engages the auxiliary needle shaft gear 344 so that the stepper motor 332 can rotate the auxiliary needle shaft 342 and thus drive the auxiliary needle pointer 338 along the auxiliary analog scale 340 on the auxiliary dial face 309.

In operation, and with continuing reference to FIG. 18b, the pressure connector 328 of the gauge 300 is attached to the refrigerant line 40 (FIG. 16) of the HVAC system. The refrigerant pressure within the refrigerant line 40 is connected through the pressure connector 328 to the inside of the bourdon tube 306. The internal pressure within the bourdon tube 306 causes the bourdon tube 306 to straighten. As the bourdon tube 306 straightens, the pointer gears 314, attached to the burden tube 306 and to the needle shaft 316, rotate causing the needle shaft 316 to rotate. The pointer gears 314 are selected so that the needle shaft 316 rotates in a predetermined linear relationship to the straightening of the bourdon tube 306 and therefore in a predetermined linear relationship to the refrigerant pressure at the pressure connector 328 and in the refrigerant line 40. As the needle shaft 316 rotates in response to the straightening or curling of the bourdon tube 306, the needle pointer 310, fixed to the proximal end 315 of the needle shaft 316, rotates with the needle shaft 316 and thereby moves along the analog scale 312 on the dial face 308 of the service gauge 300 to indicate the refrigerant pressure in the refrigerant line 40. Such operation of the bourdon tube 306 to drive of the needle pointer 310 of the analog display 302 of the service gauge 300 is conventional in the art.

As the needle shaft 316 rotates in response to the straightening and curling of the bourdon tube 306, the disc-shaped magnet 318, fixed to the distal end 317 of the needle shaft 316, rotates. The disc-shaped magnet 318 is position adjacent to the rotary position sensor 320. The rotary position sensor 320 (as previously described) determines the absolute rotary position of the needle shaft 316 by sensing the rotary position of the poles of the disc-shaped magnet 318. The rotary position sensor 320 converts the rotary position of the magnet 318 into a rotary position output signal on output line 324. The rotary position output signal on output line 324 may be either a digital signal or an analog signal and is proportional to the refrigerant pressure at the pressure connector 328 of the service gauge 300.

The microprocessor 322 receives the rotary position output signal on line 324 and the temperature on temperature input 321. From the rotary position output signal online 324, indicative of the pressure of the refrigerant, and from the temperature of the refrigerant, the microprocessor 322 can calculate various parameters including, but not limited to, the saturated vapor equivalent temperature or the super-heat/sub-cool temperature of the refrigerant. For example, once the super-heat/sub-cool temperature is calculated by the microprocessor 322, a super-heat/sub-cool signal, proportional to the super-heat/sub-cool temperature, is connected to the driver circuit 330. The driver circuit 330 amplifies the super-heat/sub-cool signal in order to drive the stepper motor 332. The rotation of the stepper motor shaft 334 is proportional to the super-heat/sub-cool temperature and drives the auxiliary needle shaft 342 by means of stepper motor drive gear 336 and auxiliary needle shaft gear 344. The angular position of the auxiliary needle shaft 342 determines the position of the auxiliary needle pointer 338 along the auxiliary analog scale 340 of the auxiliary dial face 309. Consequently, the user of the service gauge 300 can observe the actual pressure of the refrigerant by reference to the main needle pointer 310 and the main analog scale 312 while at the same time observing whether the refrigerant is super-heated on the low side of the condenser or sub-cooled on the high side of the condenser by reference to the position of the auxiliary needle pointer 338 on the auxiliary analog scale 340.

While this invention has been described with reference to preferred embodiments thereof, pressure is to be understood that variations and modifications can be affected within the spirit and scope of the invention as described herein and as described in the appended claims.

I claim:

1. A service gauge for determining refrigerant pressure of a refrigerant in a refrigerant line and for determining other parameters relating to the refrigerant in the refrigerant line comprising:
   a. a pressure sensor connected to refrigerant line for producing an electronic pressure signal proportional to the refrigerant pressure of the refrigerant in the refrigerant line, wherein the pressure sensor comprises:
      i. a bourdon tube connected to the refrigerant line and operatively connected to a magnet attached to the bourdon tube so that the magnet moves in response to the straightening and curling of the bourdon tube in response to changing pressure in the refrigerant line;
      ii. a position sensor positioned adjacent to, but not in contact with the magnet, which position sensor determines the straightening or curling position of the bourdon tube and produces the electronic pressure signal that is proportional to the refrigerant pressure;
   b. a microprocessor for receiving the electronic pressure signal and programmed to calculate an auxiliary parameter relating to the refrigerant pressure from the electronic pressure signal; and
   c. a display connected to the microprocessor for showing the calculated auxiliary parameter.

2. The service gauge of claim 1, wherein the pressure sensor further comprises pointer gears operatively connecting the bourdon tube to a needle shaft with a needle pointer attached thereto for indicating the refrigerant pressure on a dial of the service gauge, so that the needle shaft rotates in response to straightening and curling of the bourdon tube in response to changing refrigerant pressure in the refrigerant line, wherein the magnet is attached to the needle shaft for rotation therewith, and wherein the position sensor is a rotary position sensor positioned adjacent to, but not in contact with the magnet, which rotary position sensor determines the angular position of the needle shaft and produces the electronic pressure signal that is proportional to the refrigerant pressure.

3. The service gauge of claim 1, wherein the microprocessor receives the electronic pressure signal and a temperature signal and calculates the auxiliary parameter selected from the group including a saturated vapor equivalent temperature, a trend line for pressure, a trend line for saturated vapor equivalent temperature, an instantaneous pressure bar graph, pressure, and a super-heat/sub-cool temperature.

4. The service gauge of claim 3, wherein the display is a digital display for displaying the auxiliary parameter calculated by the microprocessor.

5. The service gauge of claim 2, wherein the microprocessor receives the electronic pressure signal and a temperature signal and calculates the auxiliary parameter selected from the group including a saturated vapor equivalent temperature and a super-heat/sub-cool temperature.

6. The service gauge of claim 5, wherein the display is an analog display comprising an auxiliary needle shaft with an auxiliary needle pointer attached thereto for indicating on the dial of the service gauge the auxiliary parameter calculated by the microprocessor, and a servo motor operatively connected to the auxiliary needle shaft to drive the auxiliary needle shaft in response to the receipt of a drive signal from the microprocessor proportional to the auxiliary parameter.

* * * * *